United States Patent
Iwanaga et al.

(10) Patent No.: US 11,702,591 B2
(45) Date of Patent: Jul. 18, 2023

(54) FLUORESCENT RARE EARTH COMPLEX AND SECURITY MEDIUM USING THE SAME

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Hiroki Iwanaga, Yokohama (JP); Kenji Miyazaki, Komae (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 192 days.

(21) Appl. No.: 16/818,726

(22) Filed: Mar. 13, 2020

(65) Prior Publication Data
US 2021/0071073 A1 Mar. 11, 2021

(30) Foreign Application Priority Data
Sep. 6, 2019 (JP) .................. 2019-163001

(51) Int. Cl.
| | |
|---|---|
| H01L 51/50 | (2006.01) |
| C09K 11/06 | (2006.01) |
| F21K 2/00 | (2006.01) |
| C07F 9/53 | (2006.01) |
| C07F 5/00 | (2006.01) |

(52) U.S. Cl.
CPC .............. *C09K 11/06* (2013.01); *C07F 5/003* (2013.01); *C07F 9/5345* (2013.01); *F21K 2/00* (2013.01); *C09K 2211/182* (2013.01)

(58) Field of Classification Search
None
See application file for complete search history.

(56) References Cited

U.S. PATENT DOCUMENTS 7,250,117 B2  7/2007 Iwanaga et al.

FOREIGN PATENT DOCUMENTS

| JP | 2005-15564 A | 1/2005 |
| JP | 2008-13439 A | 1/2006 |
| JP | 2006-77191 A | 3/2006 |
| JP | 2006-196777 A | 7/2006 |

(Continued)

OTHER PUBLICATIONS

Iwanaga et al., Novel Tb(III) complexes with two different structures of phosphine oxides and their properties, Journal of Luminescence 130 (2010) 812-816 (Year: 2010).*

(Continued)

*Primary Examiner* — Gregory D Clark
(74) *Attorney, Agent, or Firm* — Oblon, McClelland, Maier & Neustadt, L.L.P.

(57) ABSTRACT

The embodiments provide a fluorescent rare earth complex having strong emission intensity and excellent durability, and also provide a security medium using the complex. The rare earth complex according to the embodiment comprises a rare earth ion, a diphosphine dioxide ligand and a β-diketone ligand wherein two phosphorus atoms contained in the diphosphine dioxide ligand individually have substituents different from each other.

26 Claims, 2 Drawing Sheets

(56) References Cited

FOREIGN PATENT DOCUMENTS

| JP | 2006-213666 | A  |   | 8/2006  |         |
|----|-------------|----|---|---------|---------|
| JP | 3811142     | B2 |   | 8/2006  |         |
| JP | 2007-210945 |    | * | 8/2007  | ............ H01L 51/50 |
| JP | 2008-159604 | A  |   | 7/2008  |         |
| JP | 2008-297250 | A  |   | 12/2008 |         |
| JP | 2012-61794  | A  |   | 3/2012  |         |
| JP | 5498331     | B2 |   | 5/2014  |         |
| JP | 2017-102063 | A  |   | 6/2017  |         |

OTHER PUBLICATIONS

Iwanaga et al., Development of Novel Rare-Earth Complexes and Their Application to Emission Devices, Journal of Photopolymer Science and Technology, vol. 21, No. 2008, 165-172 (Year: 2008).*

Hiroki Iwanaga, "A $CF_3$-substituted diphosphine dioxide ligand that enhances both photoluminescence intensity and solubility of Eu(III) complexes", Journal of Alloys and Compounds, Mar. 9, 2019, vol. 790, pp. 296-304.

* cited by examiner

FLUORESCENT RARE EARTH COMPLEX AND SECURITY MEDIUM USING THE SAME

CROSS-REFERENCE TO RELATED APPLICATIONS

This application is based upon and claims the benefit of priority from the prior Japanese Patent Application No. 2019-163001, filed on Sep. 6, 2019, the entire contents of which are incorporated herein by reference.

FIELD

Embodiments of the present disclosure relate to a rare earth complex excellent in emission intensity and durability, also to a composition containing the rare earth complex, and further to a security medium provided with the rare earth complex.

BACKGROUND

Rare earth complexes characteristically absorb light in the UV wavelength region and exhibit sharp emission spectra, and it is hoped that they will be exploited in many fields, such as, light-emitting devices, sensors, and security media. In order to employ rare earth complexes in those applications, they are required to be excellent in emission intensity, solubility in polymers and solvents, and durability. Phosphors having those favorable properties have been under research and development, and it has been demanded to provide a phosphor having higher performance than conventional ones.

DETAILED DESCRIPTION

Figure 1:
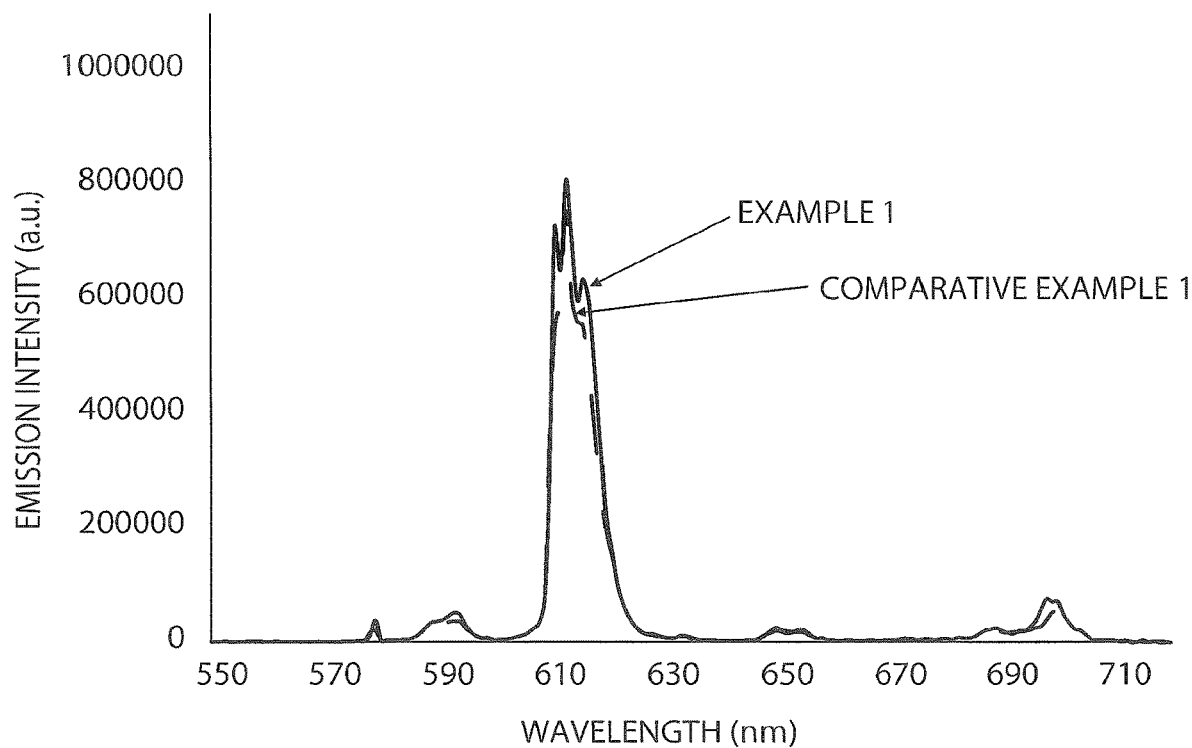
FIG. 1 shows fluorescent spectra of Example 1 and Comparative example 1.

Embodiments will now be explained with reference to the accompanying drawings.

A rare earth complex according to the embodiment comprises:
  a rare earth ion,
  a diphosphine dioxide ligand, and
  a β-diketone ligand wherein two phosphorus atoms contained in said diphosphine dioxide ligand individually have substituents different from each other.

Further, a composition for forming a security medium according to the embodiment comprises the above rare earth complex and a polymer.

In addition, a security medium according to the embodiment comprises a substrate and the above rare earth complex provided thereon.

<Rare Earth Complex>

The rare earth complex according to the embodiment comprises a rare earth ion, a diphosphine dioxide ligand, and a β-diketone ligand. This rare earth complex is a phosphor that absorbs UV light and then emits fluorescence.

In the embodiment, the rare earth ion can be so selected as to give off emission at the wavelength appropriate to the aimed application, but is preferably a lanthanide ion. Specifically, europium and terbium are preferred, and europium is particularly preferred in view of obtaining a phosphor complex showing such a large spectrum in the red region as realizes excellent color rendering properties.

In the structure of the diphosphine dioxide ligand contained in the rare earth complex according to the embodiment, there are two P=O bonds through which the ligand is coordinated to the rare earth ion. Two phosphorus atoms in the two P=O bonds can individually have various substituents. In the embodiment, the substituents individually connecting to the two phosphorus atoms are different from each other. This means that the diphosphine dioxide ligand has an asymmetrical form. The asymmetrical form distorts the ligand field and consequently enhances the quantum yield. The emission intensity of the rare earth complex is proportional to the product of the quantum yield and the absorption coefficient, and accordingly the emission intensity can be enhanced in proportion to the quantum yield. Further, if the diphosphine dioxide ligand has an asymmetrical form, the complex tends to have high solubility in solvents and the like.

Each phosphorus atom can have two substituents. In the embodiment, a substituent set connecting to one of the two phosphorus atoms is different from another substituent set connecting to the other. For example, (i) one phosphorus atom has an aliphatic hydrocarbon group and an aromatic hydrocarbon group while the other has two aliphatic hydrocarbon groups;

(ii) one phosphorus atom has an aliphatic hydrocarbon group and an aromatic hydrocarbon group while the other has two aromatic hydrocarbon groups; or otherwise (iii) one phosphorus atom has two aliphatic hydrocarbon groups while the other has two aromatic hydrocarbon groups.

In the embodiment, the "aliphatic hydrocarbon group" here means not only a substituent group consisting of only carbon and hydrogen atoms but also a group containing an oxygen, nitrogen or sulfur atom, such as, a substituent containing a hydroxy or amino group. Also, the "aromatic hydrocarbon group" in the embodiment may be a group in which the aromatic ring contains a nitrogen or sulfur atom as a ring member. For example, the aromatic hydrocarbon group may be a pyridyl group or a thienyl group. Further, the aromatic hydrocarbon group may have a substituent containing an oxygen, nitrogen or sulfur atom, such as, a substituent containing a hydroxy or amino group.

For the purpose of preparing the asymmetrical diphosphine dioxide ligand, it is possible to use, for example, a combination of aliphatic hydrocarbon groups having different numbers of carbon atoms. However, in view of enhancing the distortion of the ligand field, it is preferred to form the asymmetry by use of a combination of aliphatic hydrocarbon groups and aromatic hydrocarbon groups. Specifically, the asymmetrical diphosphine dioxide ligand preferably contains at least one aliphatic hydrocarbon group connecting to one of the two phosphorus atoms and at least one aromatic hydrocarbon group connecting to the other. Particularly preferably, two aliphatic hydrocarbon groups connect to one phosphorus atom while two aromatic hydrocarbon groups connect to the other (this corresponds to the (iii) described above).

The two substituents connecting to each phosphorus atom may link together to form a ring.

The β-diketone ligand in the rare earth complex according to the embodiment can be freely selected from known ones. The β-diketone ligand not only serves as a counter ion to the cationic rare earth ion, but also contributes to formation of the ligand field in the complex. In the embodiment, a particular β-diketone ligand is adopted so as to obtain a rare earth complex having high durability.

The β-diketone ligand according to the embodiment preferably has a halogenated hydrocarbon group because it enhances the emission intensity. The reason thereof is that the halogenated hydrocarbon group is so electron-withdrawing that the energy difference (ΔE) between the excited triplet state of the β-diketone ligand and the excited state levels $^5D_0$ and $^5D_1$ of the trivalent rare earth ion is enough reduced to enhance the efficiency of energy transfer from the ligand to the trivalent rare earth ion. The linking group thereof normally attaches to the 1- and/or 3-position of the β-diketone skeleton. If having an asymmetrical structure, the β-diketone ligand also tends to enhance the emission intensity.

Although containing the β-diketone ligand serving as a counter ion to the rare earth ion, the rare earth complex of the embodiment may contain another anion as the counter ion. Examples of the anion include halogen ion, hydroxy ion and carboxylate ion.

The rare earth complex is preferably represented by the following formula (1):

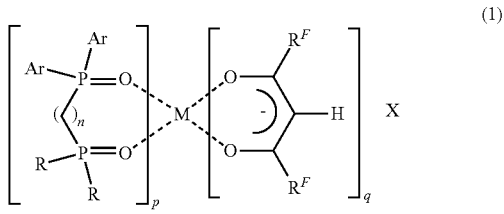

wherein
each Ar is independently an aryl group,
each R is independently a straight or branched alkyl group,
each $R^F$ is independently a halogenated hydrocarbon group,
n is an integer of 3 to 5,
p is an integer of 1 or 2,
q is an integer of 1 to 3,
M is a rare earth ion, and
X is absent when q is 3 but is an anion having a valence of 3-q when q is 1 or 2. This complex is a rare earth ion, such as europium (III) ion or terbium (III) ion, coordinated with a diphosphine dioxide ligand and a β-diketone ligand. Specifically, the complex represented by the following formula (1a), in which the rare earth ion is europium (III), is particularly preferred because it shows high emission intensity.

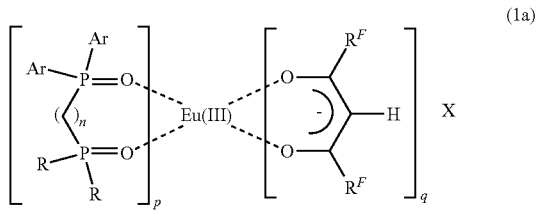

(wherein Ar, R, $R^F$, n, p and q are individually the same as those described above.)

In the formula (1), two aryl groups connect to one of the two phosphineoxides (P=O) while two alkyl groups connect to the other. Since the complex has such an asymmetrical structure, the emission intensity can be improved.

The two aryl (Ar) groups in the formula (1) may be the same as or different from each other. There are no particular restrictions on the aryl group, but the number of carbon atoms contained therein is preferably 6 to 20, more preferably 6 to 12, in view of the solubility and durability of the rare earth complex. The aryl group may have substituents such as hydroxy and alkoxy groups as long as they do not impair the effect of the embodiment. Specifically, the aryl group is preferably phenyl, 2-methylphenyl, 1-ethoxyphenyl or naphthyl, more preferably phenyl. If the aryl group is a phenyl group having a substituent at the 2-position, the solubility tends to be enhanced. The two Ar groups may link together to form a cyclic structure containing the phosphorus atom. Specifically, for example, it may be a structure in which phenylene groups connect to a phosphorus atom via two hydrocarbon chains.

In the formula (1), the two alkyl (R) groups may be the same as or different from each other. There are also no particular restrictions on the alkyl group, but the number of carbon atoms contained therein is preferably 3 to 10, more preferably 4 to 8, in view of the solubility and durability of the rare earth complex. The alkyl group may have substituents such as hydroxy and alkoxy groups as long as they do not impair the effect of the embodiment. Specifically, examples of the alkyl group include n-butyl, 1-methylpropyl, t-butyl, n-hexyl, 2-ethylbutyl, and n-octyl. The embodiment includes the complex in which the two R groups link together to form a cyclic structure containing the phosphorus atom. Specifically, for example, it may be a heterocyclic structure in which alkylene chains, particularly, alkylene chains of 3 to 10 carbon atoms connect to one phosphorus atom.

The two phosphorus atoms in the formula (1) link together via an alkylene chain having n carbon atoms. The integer n is 3 to 5, preferably 4. For realizing high durability, the integer n must be within that range. If it is 2 or less, the positional relation between the two phosphineoxides is so restricted as to weaken the coordinate bond of the diphosphine dioxide ligand and consequently the emission intensity is lowered. On the other hand, if the integer n is 6 or more, the diphosphine dioxide ligand may singly connect with two rare earth ions to form a dinuclear complex, which lowers the solubility.

The β-diketone ligand in the formula (1) has two halogenated hydrocarbon groups $R^F$s at the 1- and 3-positions. Since the β-diketone ligand has halogenated hydrocarbon groups, when the complex absorbs light, energy can transfer from the excited ligand to the rare earth ion with such high efficiency as to realize high emission intensity. There are no particular restrictions on how many carbon atoms the halogenated hydrocarbon group has, but it preferably has 8 or less, more preferably 1 to 3 carbon atoms in view of realizing high solubility. The halogenated hydrocarbon group is preferably a perfluoroalkyl group, and is more preferably $CF_3$, $C_2F_5$ or $C_3F_7$. The two $R^F$s may be the same as or different from each other, but are preferably different so that the β-diketone ligand may be asymmetrical to increase the ligand field distortion enough to enhance the emission intensity.

It is generally known that rare earth complexes are improved in light resistance and quantum yield if the two substituents of the β-diketone ligand are perfluoroalkyl groups. On the other hand, however, it is also known that complexes having that structure have poor solubility in polymers and/or solvents and hence that compositions containing those complexes (i.e., solutions of the complexes dissolved in polymers and/or solvents) often have poor transparency. The complexes impaired in transparency are unfavorable for application to security media. In the embodiment, the diphosphine dioxide ligand has such a particular structure as to realize both that the complex can keep high solubility and that the composition thereof can have high transparency.

In the rare earth complex according to the embodiment, the β-diketone ligand as well as the diphosphine dioxide ligand is preferably asymmetrical. The inventors think the reason of that as follows.

When coordinating to the rare earth ion, the β-diketone releases a proton at the active methylene moiety to be in an anionic state and thereby electrically neutralizes the rare earth ion. Accordingly, if the proton returns back to the β-diketone anion and thereby brings it again into the neutral charge state, the β-diketone ligand dissociates from the rare earth ion and consequently the rare earth complex is quenched. This means that the dissociation tendency of the β-diketone ligand from the rare earth ion increases according as the neutralizing stabilization energy increases on the basis of comparison between the anionic state and the neutral charge state.

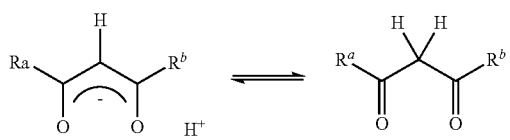

In view of the above, it was research how much the anionizing stabilization energy of β-diketone is affected by substituents. Specifically, under the condition that the substituents (namely, $R^a$ and $R^b$ in the above formula) were changed, the stabilization energy $E_s$ obtained by attaching a proton onto the anion was calculated according to the density functional theory. The results are shown in the following table.

| $R^a$ | $R^b$ | $E_S$ |
|---|---|---|
| Me | Me | 351 |
| t-Bu | t-Bu | 349 |
| $CF_3$ | $CF_3$ | 314 |
| $C_3F_7$ | t-Bu | 328 |
| $C_3F_7$ | $C_3F_7$ | 310 |
| $C_3F_7$ | $CF_3$ | 312 |
| $C_3F_7$ | Naph | 327 |
| $CF_3$ | Naph | 329 |

In the table, Me, t-Bu and Naph are methyl, t-butyl and naphthyl, respectively.

The above results indicate that the set of (Me, Me) or (t-Bu, t-Bu) provides the largest stabilization energy $E_s$ and hence that the β-diketone ligand having them tends to dissociate easily.

When the set is ($C_3F_7$, t-Bu), ($C_3F_7$, Naph) or ($CF_3$, Naph), the stabilization energy decreases considerably. However, since those sets include non-perfluoroalky substituents, the complex has insufficient light resistance. When both substituents are perfluoroalkyl groups, namely, when the set is ($CF_3$, $CF_3$), ($C_3F_7$, $C_3F_7$) or ($C_3F_7$, $CF_3$), the stabilization energy is as small as 310 to 314 kcal/mol. This indicates that the β-diketone ligand having them hardly dissociates.

However, if the set is ($CF_3$, $CF_3$), the complex tends to have poor solubility in solvents. In contrast, the set of ($C_3F_7$, $C_3F_7$) can improve the solubility because the substituents provide such an effect of steric hinderance as to reduce interactions among the solute molecules. The solubility can be also improved by the set of ($C_3F_7$, $CF_3$) because of its asymmetrical molecular structure.

In general, a phosphine oxide ligand and a rare earth ion function as a Lewis base and a Lewis acid, respectively, to form a coordinate bond. As compared with when two phosphine oxide ligands coordinate, dissociation tends not to occur when one diphosphine dioxide ligand does because of the chelate effect. However, if the diphosphine dioxide ligand has a symmetrical structure, the quantum yield is often so limited that the rare earth complex may exhibit insufficient emission intensity. Since having an "asymmetrical diphosphine dioxide", the rare earth complex of the embodiment realizes higher quantum yield.

As described above, the most favorable rare earth complex according to the embodiment comprises a β-diketone ligand in which the substituents are ($C_3F_7$, $C_3F_7$) or ($C_3F_7$, $CF_3$) and an asymmetrical diphosphine dioxide ligand in which one phosphorus atom has two aliphatic hydrocarbon groups and the other phosphorus atom has two aromatic hydrocarbon groups.

The rare earth complex of the embodiment has p diphosphine dioxide ligands and q β-diketone ligands provided that p is an integer of 1 or 2 and q is an integer of 1 to 3. The most typical complex has one diphosphine dioxide ligand (p=1) and three diketone ligands (q=3) and hence has an 8-coordinate structure. In this case, the charge of the rare earth ion is cancelled out with three β-diketone ligands and accordingly the counter ion X is absent.

The complex may have two or less β-diketone ligands. In that case, two diphosphine dioxide ligands can generally coordinate but the counter ion X is necessary so as to cancel out the charge of the whole complex. That counter ion may be either one divalent anion or a set of two monovalent anions.

The rare earth complex of the embodiment may further contain a ligand other than the diphosphine dioxide ligand or the β-diketone ligand as long as the effect of the embodiment is not impaired.

Examples of the rare earth complex according to the embodiment include the following (1-1) to (1-42). Among them, (1-1) to (1-12) are particularly preferred.

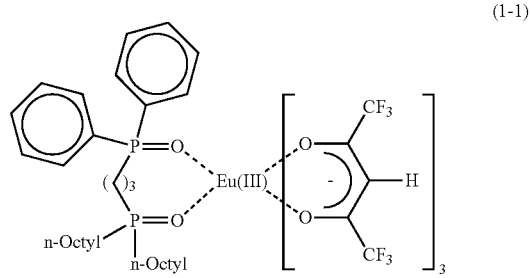

(1-1)

(1-2)
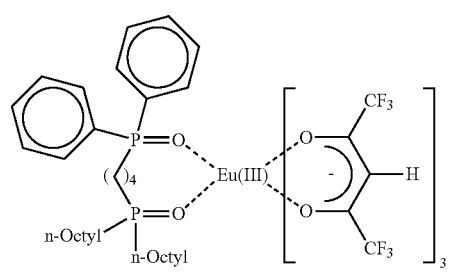
(1-3)
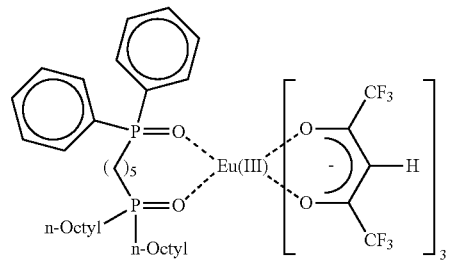
(1-4)
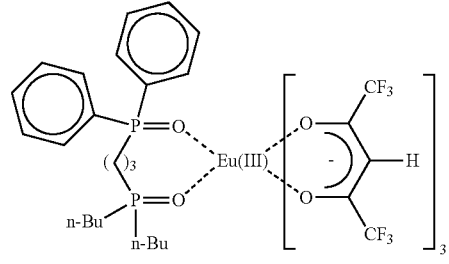
(1-5)
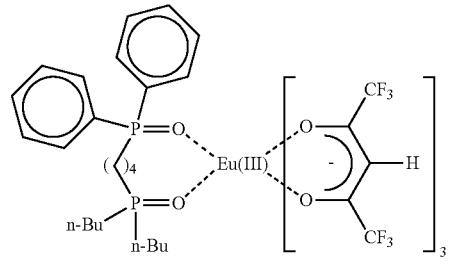
(1-6)
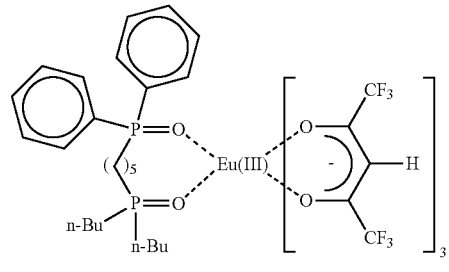
(1-7)
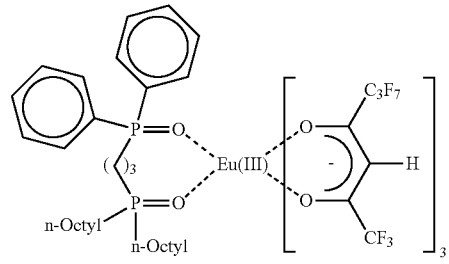
(1-8)
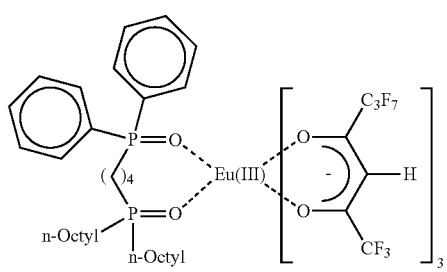
(1-9)
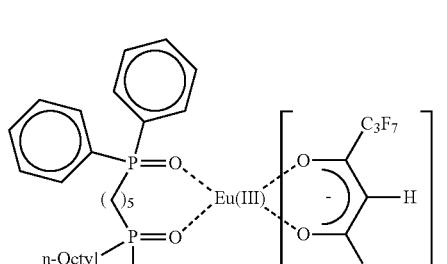
(1-10)
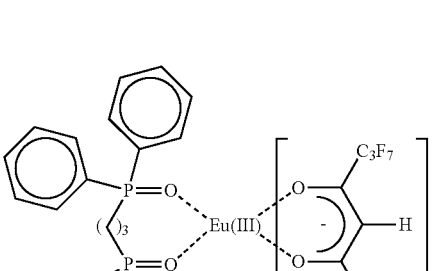
(1-11)
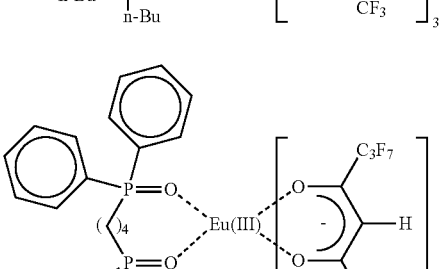
(1-12)
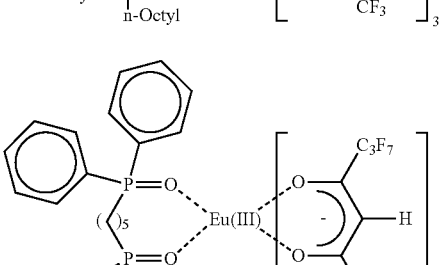
(1-13)
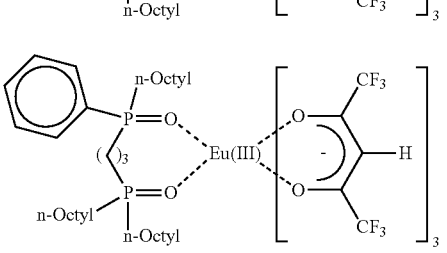

(1-14)
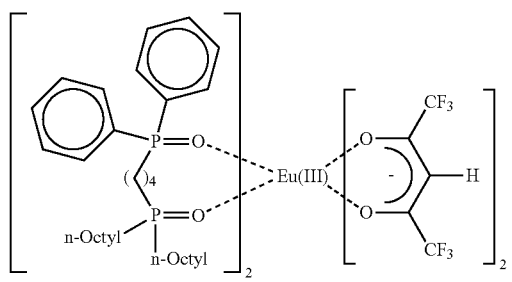
(1-15)
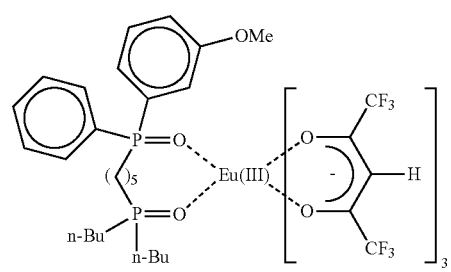
(1-16)
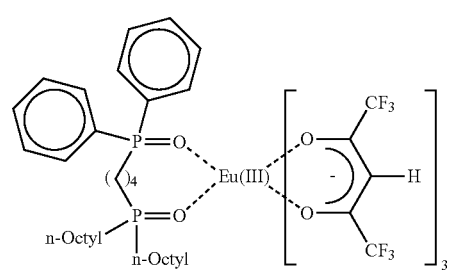
(1-17)
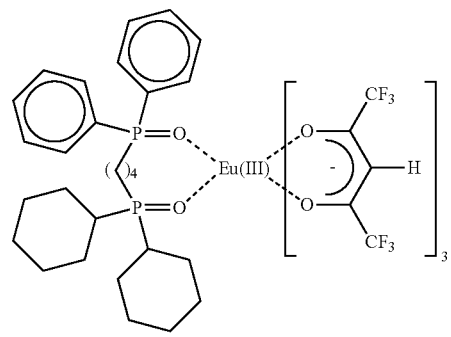
(1-18)
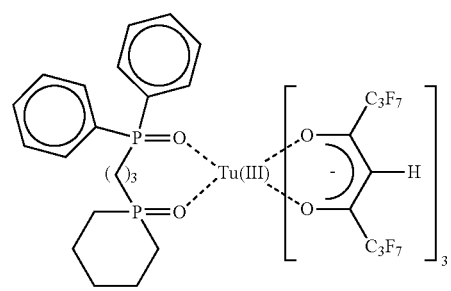
(1-19)
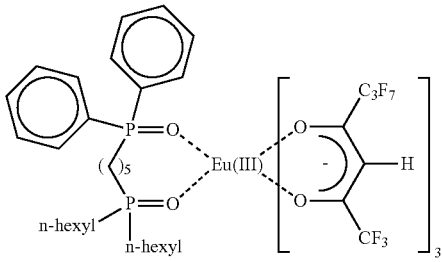
(1-20)
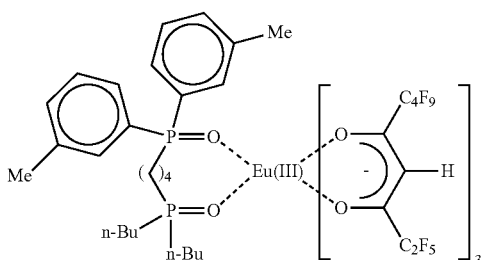
(1-21)
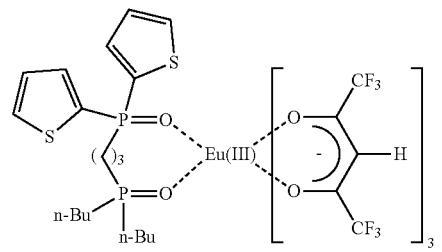
(1-22)
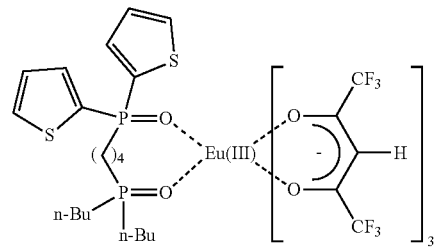
(1-23)
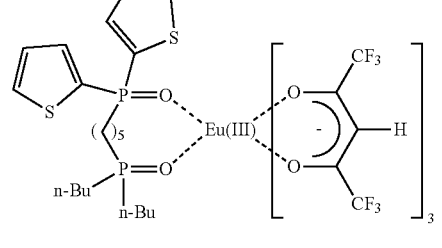
(1-24)
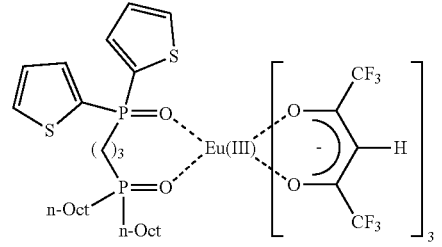

(1-25)
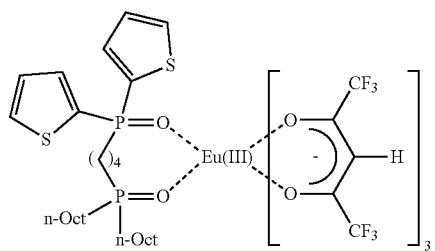
(1-26)
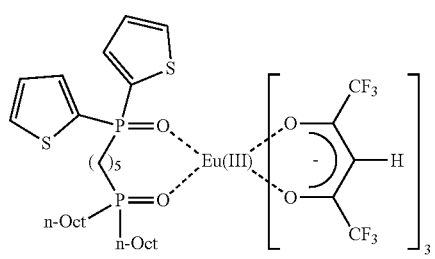
(1-27)
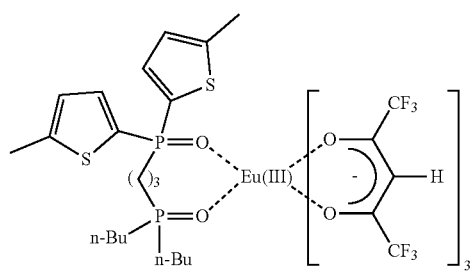
(1-28)
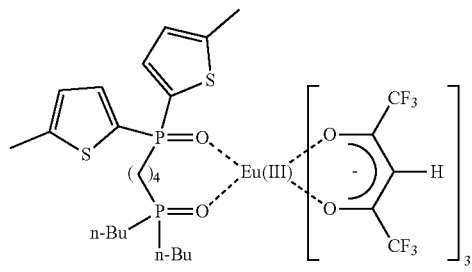
(1-29)
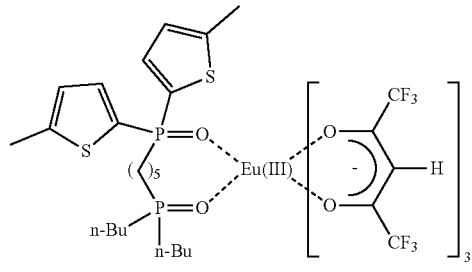
(1-30)
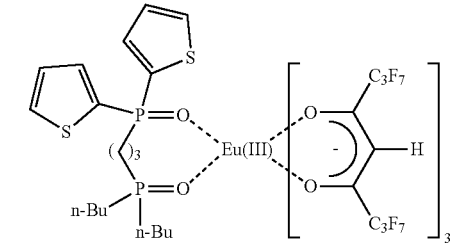
(1-31)
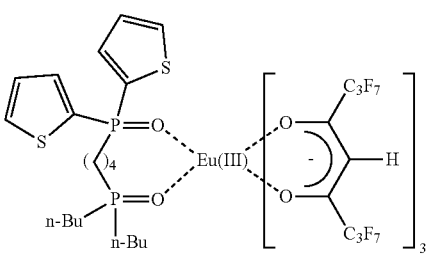
(1-32)
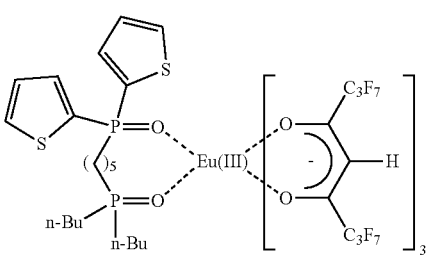
(1-33)
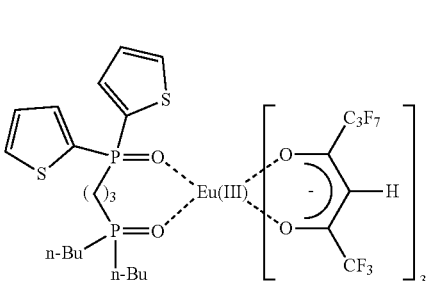
(1-34)
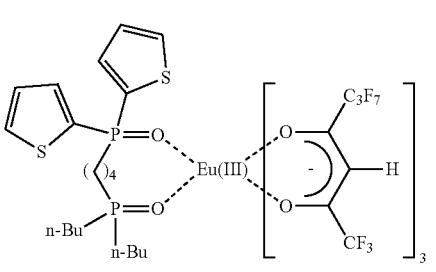
(1-35)
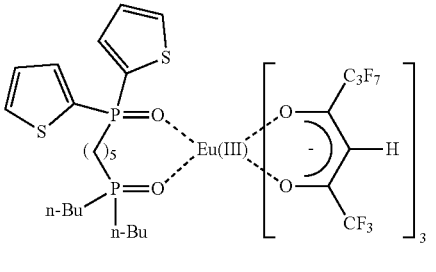
(1-36)
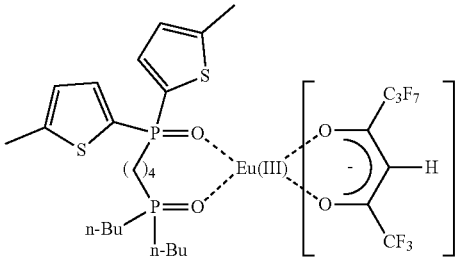

(1-37)

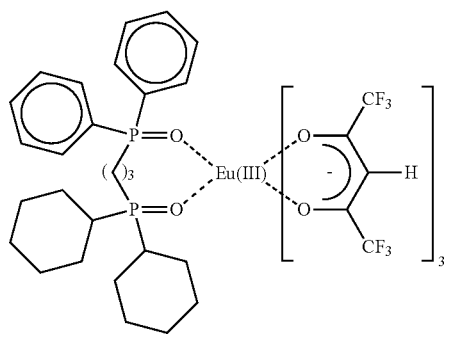

(1-38)

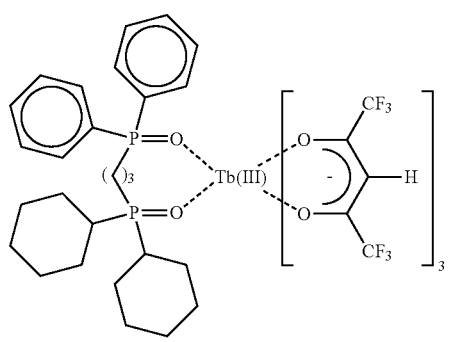

(1-39)

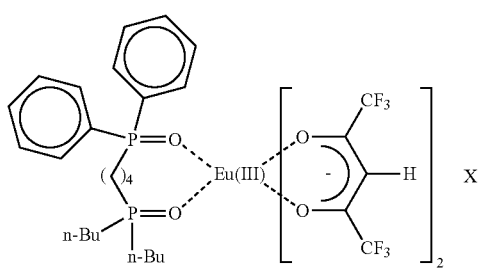

(1-40)

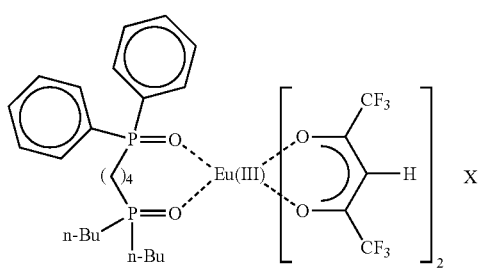

(1-41)

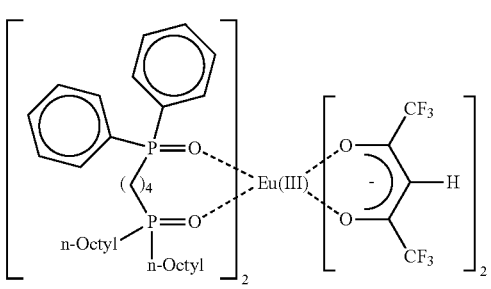

(1-41)

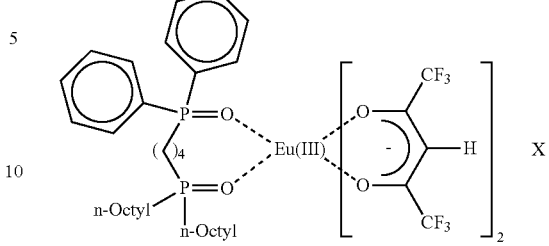

Xa: counter ion or other ligands

In addition to the above, two or more of the above rare earth complexes can be used in combination as a mixture, which also has as excellent properties as each complex of the embodiment. Specifically, for example, preferred is a mixture of two or more rare earth complexes comprising
 rare earth ions,
 diphosphine dioxide ligands, and
 β-diketone ligands wherein
 said mixture contains at least two rare earth complexes selected from the group consisting of:
 (a) a first rare earth complex comprising
  said rare earth ion,
  one of said diphosphine dioxide ligands, and
  three of said β-diketone ligands;
 (b) a second rare earth complex comprising
  said rare earth ion,
  two of said diphosphine dioxide ligands, and
  two of said β-diketone ligands; and
 (c) a third rare earth complex comprising
  said rare earth ion,
  one of said diphosphine dioxide ligands, and
  two of said β-diketone ligands provided that
  two phosphorus atoms contained in each said diphosphine dioxide ligand individually have substituent sets different from each other.

In the synthesis process of the rare earth complex, rare earth complexes different in numbers of the diphosphine dioxide ligands and the β-diketone ligands are often produced as a mixture. However, it is unnecessary to separate and isolate the complexes from the mixture, and the mixture can be directly used and hence the production process can be very simplified. In view of that, the rare earth complex mixture is preferably adopted.

Further, the rare earth complex of the embodiment may be a polynuclear complex which comprises two or more rare earth ions and in which two rare earth ions are bridged with one diphosphine dioxide ligand. Specifically, one diphosphine dioxide ligand in a complex (mononuclear complex) represented by the formula (1) connects to one rare earth ion. In contrast, in a polynuclear complex, one diphosphine dioxide ligand connects to two different rare earth ions, so as to form a binuclear complex containing two rare earth ions or a metal organic framework having a straight chain or branched chain structure in which three or more rare earth ions are connected via one diphosphine dioxide ligand. The rare earth complex of the embodiment may have those structures. Since having two phosphorus atoms linked together with a single-bond carbon chain, the diphosphine dioxide ligand in the embodiment tends to form a bridge between two metal atoms.

<Composition for Forming a Light Wavelength-Converting Medium>

The rare earth complex of the embodiment characteristically has large saturation solubility in media, such as, solvents and polymers. Accordingly, the complex can be dissolved in, for example, a polymer to prepare a composition with which an appropriate substrate is coated to produce a light wavelength-converting medium, such as an ornament or a security medium, which is colorless and transparent under room light but strongly fluorescent under UV or near UV light. Specifically, for example, a composition comprising the rare earth complex of the embodiment dissolved in a polymer can be used as an ink for printing bar-codes on security cards or the like, to produce security media that are completely colorless under visible light but strongly fluorescent under UV light. Those media can ensure higher security because it is difficult under visible light even to know there are bar-codes thereon.

The composition for producing the light wavelength-converting media can be prepared by dissolving the rare earth complex of the embodiment in an appropriate solvent or polymer. Since having high durability or stability, the complex of the embodiment is stable even when dissolved in a solvent or polymer and accordingly hardly decomposes even when dissolved in a strongly acidic or basic solvent. The solvent can be suitably selected from known organic solvents and the like. Examples thereof include: esters, such as, ethyl acetate; fluorinated aliphatic hydrocarbons, such as, perfluoropentane; aromatic hydrocarbons, such as, toluene and xylene; and alcohols, such as, ethanol, methanol, isopropanol and butanol.

When the rare earth complex of the embodiment is dissolved in a polymer, it is preferred to use a transparent resin such as acrylic resin, polyester resin or vinyl chloride-vinyl acetate copolymer resin. As described above, since being stable even under a strongly acidic condition, the rare earth complex of the embodiment can keep high durability even when dispersed or dissolved in an acidic resin. In view of that, the embodiment is advantageous.

The acidic resin, for example, has a carboxyl group. Example thereof include: alkyd resins, such as, linseed oil-modified maleic alkyd resin and acryl-modified alkyd resin; and polyacrylic resin. The acidic resin may have sulfonic acid, such as, polystyrene sulfonic acid. Further, many acidic cation-exchange resins can be adopted as the acidic resin.

According to necessity, the composition may contain additives, such as, surfactant, antifoaming agent, antiseptic agent and pH adjuster. When used for security media, the composition according to the embodiment is generally preferred to have low visibility and hence to be colorless and transparent under visible light. However, if necessary, dyes or pigments can be incorporated therein. Further, the rare earth complex can be enclosed in microcapsules so as to keep stably.

<Light Wavelength-Converting Medium>

The light wavelength-converting medium, such as a security medium, according to the embodiment comprises a substrate and the above rare earth complex provided thereon. The medium having that structure can be produced by coating a substrate with the above composition. The substrate may be made of any material, such as paper, plastics, cloth, nonwoven or ceramics. There are no particular restrictions on the coating method, but in general a specific image is printed or transferred onto the substrate to form a distinctive mark.

In another way, the rare earth complex is dissolved in a polymer and then the polymer is cured to be a substrate. By use of that substrate, it becomes possible to produce a security medium in which the substrate itself emits light under UV light.

EXAMPLES

The following examples will explain the embodiments, but they by no means restrict the embodiments.

Example 1

The Eu(III) complex represented by the formula (1-1) was dissolved in ethyl acetate ($2\times10^{-4}$ mol/L), and the emission spectrum thereof was measured. FIG. 1 shows the obtained spectrum. The maximum absolute quantum yield of the complex (1-1) was found to be 0.47 in the solution.

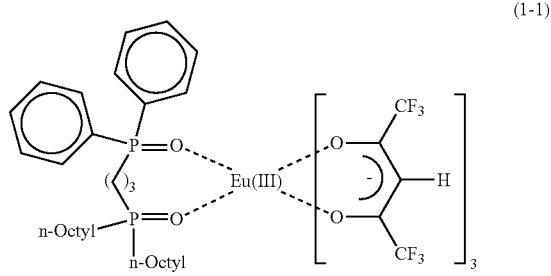

(1-1)

Comparative Example 1

The emission spectrum of the Eu(III) complex represented by the formula (R-1) was measured in the same manner as in Example 1. The maximum absolute quantum yield of the complex (R-1) in the solution was found to be 0.40, which indicates that the emission intensity of the complex (R-1) is weaker than that of the complex (1-1).

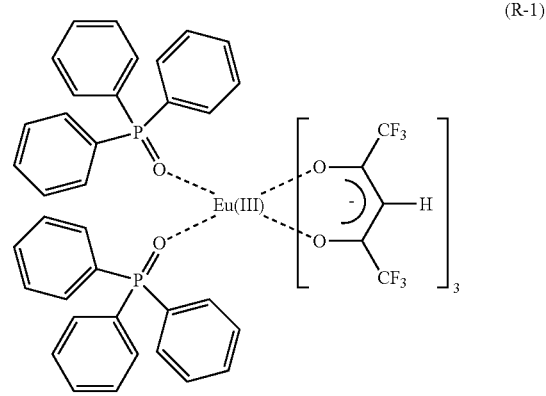

(R-1)

Example 2

Figure 2:
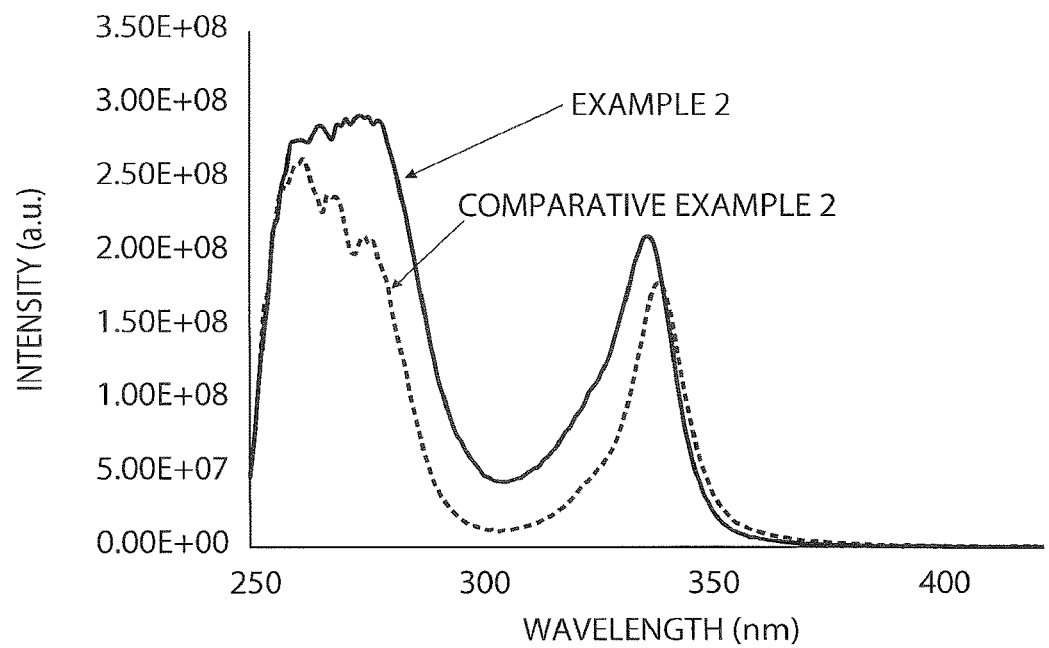
FIG. 2 shows excitation spectra of Example 2 and Comparative example 2.

The excitation spectrum of the solution prepared in Example 1 was measured. FIG. 2 shows the obtained spectrum.

Comparative Example 2

The excitation spectrum of the solution prepared in Comparative example 1 was measured. FIG. 2 shows the obtained spectrum, which indicates that the excitation intensity of the complex (R-1) is weaker than that of the complex (1-1).

Example 3

Figure 3:
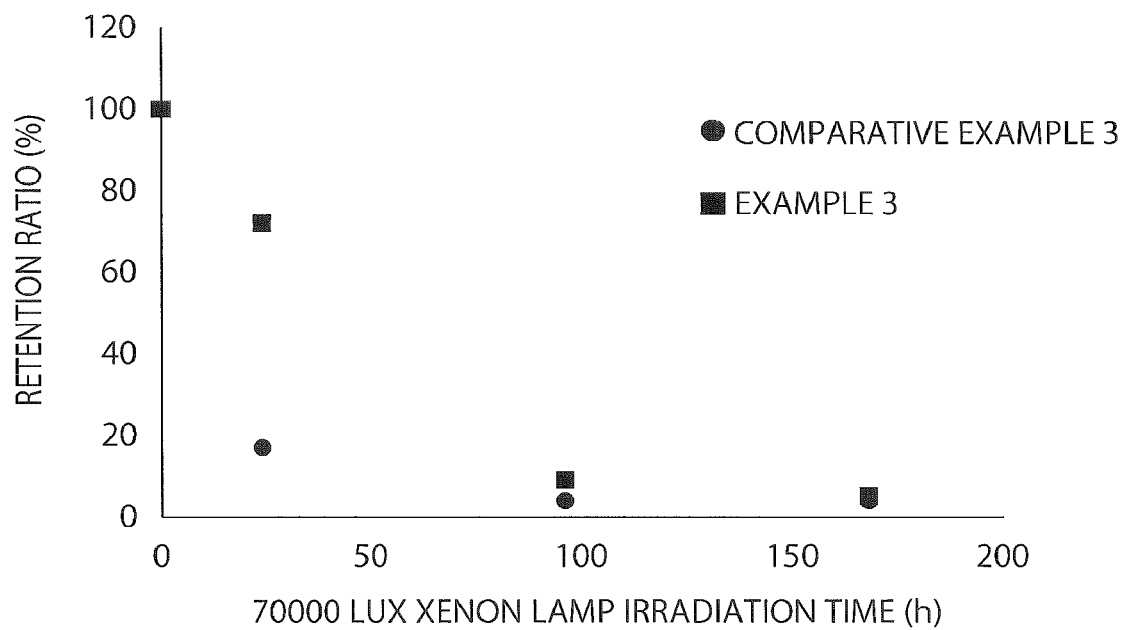
FIG. 3 is a graph showing results of durability tests in Example 3 and Comparative example 3.

The solution prepared in Example 1 was applied on a sheet of paper, dried and then subjected to a light-resistance test according to JISB7754 "light and weathering resistance test with a xenon arc lamp". As shown in FIG. 3, the luminance retention ratio of the complex (1-1) after 24 hours was found to be as high as 72%.

Comparative Example 3

The solution prepared in Comparative example 1 was applied on a sheet of paper, dried and then subjected to the light-resistance test in the same manner as in Example 3. As shown in FIG. 3, the luminance retention ratio of the complex (R-1) after 24 hours was 17%, from which it was found that the complex (R-1) is much inferior to the complex (1-1).

Example 4

The procedure of Example 1 was repeated except for using the complex represented by the formula (1-8) as the phosphor to evaluate the absolute quantum yield and light resistance in the solution. As a result, it was found that the absolute quantum yield of the complex (1-8) is about 1.2 times as high as that of the complex (1-1) and that the light resistance of the complex (1-8) is the same as or better than that of the complex (1-1).

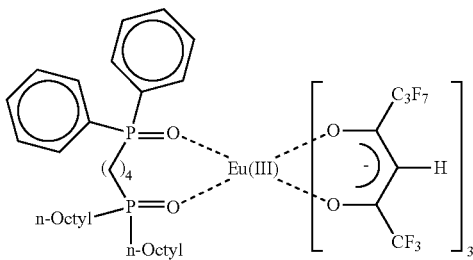

(1-8)

Comparative Example 4

Figure 4:
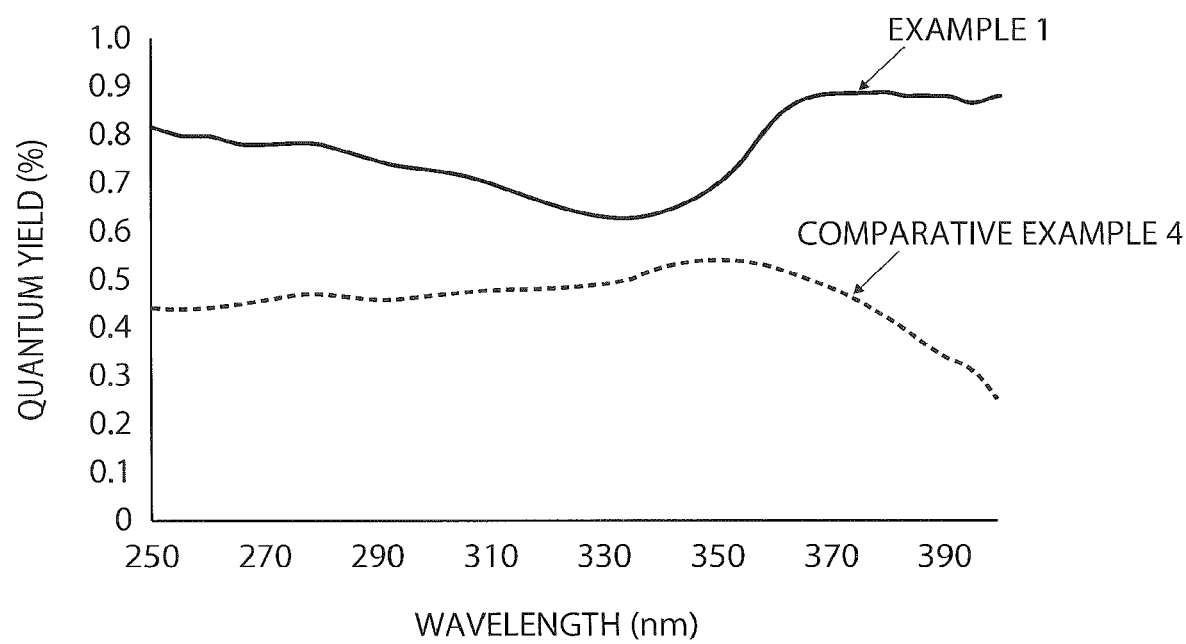
FIG. 4 shows quantum yields of Example 1 and Comparative example 4.

The complexes (1-1) and (R-2) were evaluated as phosphors on the quantum yield and light resistance. First, with respect to each of the complexes (1-1) and (R-2), the absolute quantum yield in the solid crystal state was measured while changing the wavelength. FIG. 4 shows the results, which indicate that the absolute quantum yield of the complex (R-2) is about 0.7 times as large as that of the complex (1-1) in the solid crystal state. In addition, the fluorescence emitted from the complex (R-2) was almost quenched after 24 hours.

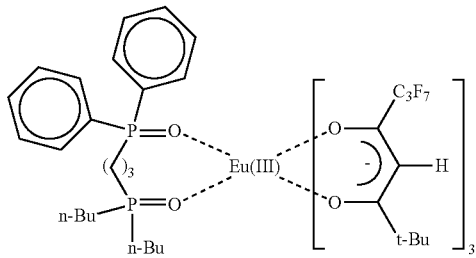

(R-2)

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the invention.

The invention claimed is:

1. A rare earth complex, which is represented by the following formula (1)

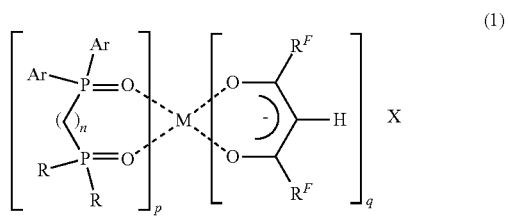

(1)

wherein
each Ar is independently an aryl group,
each R is independently a straight or branched alkyl group,
each $R^F$ is independently a halogenated hydrocarbon group,
n is 4,
p is an integer of 1 or 2,
q is an integer of 1 to 3,
M is a rare earth ion, and
X is absent when q is 3 but is an anion having a valence of 3-q when q is 1 or 2, wherein said two RF groups have different chain lengths.

2. A rare earth complex, which is represented by the following formula (1)

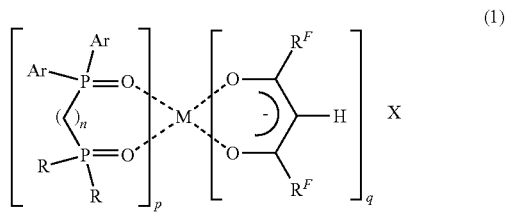

(1)

wherein
 each Ar is independently an aryl group,
 each R is independently a straight or branched alkyl group,
 each $R^F$ is independently a halogenated hydrocarbon group,
 n is an integer of 3 to 5,
 p is an integer of 1 or 2,
 q is an integer of 1 to 3,
 M is a rare earth ion, and
 X is absent when q is 3 but is an anion having a valence of 3-q when q is 1 or 2,
 wherein said two $R^F$ groups have different chain lengths.

3. The rare earth complex according to claim 1, wherein said integers p and q satisfy the conditions of p=1 and q=3, respectively.

4. The rare earth complex according to claim 1, wherein said two Ar groups are both substituted or unsubstituted phenyl groups.

5. The rare earth complex according to claim 1, wherein said R group is an alkyl group having 3 to 10 carbon atoms.

6. A rare earth complex comprising:
 a rare earth ion,
 a diphosphine dioxide ligand, and
 a β-diketone ligand
 wherein two phosphorus atoms contained in said diphosphine dioxide ligand individually have substituents different from each other, which is a polynuclear complex comprising two or more rare earth ions and having a structure in which two rare earth ions are bridged with said diphosphine dioxide ligand alone.

7. A rare earth complex mixture which contains two or more rare earth complexes comprising
 rare earth ions,
 diphosphine dioxide ligands, and
 β-diketone ligands
 wherein said mixture contains at least two rare earth complexes selected from the group consisting of:
 (a) a first rare earth complex comprising
  said rare earth ion,
  one of said diphosphine dioxide ligands, and
  three of said β-diketone ligands;
 (b) a second rare earth complex comprising
  said rare earth ion,
  two of said diphosphine dioxide ligands, and
  two of said β-diketone ligands; and
 (c) a third rare earth complex comprising
  said rare earth ion,
  one of said diphosphine dioxide ligands, and
  two of said β-diketone ligands
 provided that
  two phosphorus atoms contained in each said diphosphine dioxide ligand individually have substituent sets different from each other.

8. The rare earth complex mixture according to claim 7, wherein said rare earth ions are europium (III) ions or terbium (III) ions.

9. A light wavelength-converting medium, comprising the rare earth complex according to claim 1 and a polymer.

10. A light wavelength-converting medium, comprising the rare earth complex mixture according to claim 7 and a polymer.

11. A light wavelength-converting medium, comprising a substrate and the rare earth complex according to claim 1 provided thereon.

12. A light wavelength-converting medium, comprising a substrate and the rare earth complex mixture according to claim 7 provided thereon.

13. The light wavelength-converting medium according to claim 9, wherein said polymer comprises acrylic resin, polyester resin or a mixture thereof.

14. The light wavelength-converting medium according to claim 9, wherein said polymer is an acidic resin and said rare earth complex is dissolved or dispersed in said polymer.

15. The light wavelength-converting medium according to claim 14, wherein said acidic resin is selected from the group consisting of alkyd resin, polyacrylic resin, polystyrene sulfonic acid and acidic cation-exchange resin.

16. The rare earth complex according to claim 1, wherein said rare earth ion is a europium (III) ion or a terbium (III) ion.

17. The rare earth complex according to claim 2, wherein said rare earth ion is a europium (III) ion or a terbium (III) ion.

18. The rare earth complex according to claim 2, wherein said integers p and q satisfy the conditions of p=1 and q=3, respectively.

19. The rare earth complex according to claim 2, wherein said two Ar groups are both substituted or unsubstituted phenyl groups.

20. The rare earth complex according to claim 2, wherein said R group is an alkyl group having 3 to 10 carbon atoms.

21. The rare earth complex according to claim 2, which is a polynuclear complex comprising two or more rare earth ions and having a structure in which two rare earth ions are bridged with said diphosphine dioxide ligand alone.

22. A light wavelength-converting medium, comprising the rare earth complex according to claim 2 and a polymer.

23. A light wavelength-converting medium, comprising a substrate and the rare earth complex according to claim 2 provided thereon.

24. The light wavelength-converting medium according to claim 23, wherein said polymer comprises acrylic resin, polyester resin or a mixture thereof.

25. The light wavelength-converting medium according to claim 23, wherein said polymer is an acidic resin and said rare earth complex is dissolved or dispersed in said polymer.

26. The light wavelength-converting medium according to claim 25, wherein said acidic resin is selected from the group consisting of alkyd resin, polyacrylic resin, polystyrene sulfonic acid and acidic cation-exchange resin.

* * * * *